US012535845B2

(12) United States Patent
Reimeringer et al.

(10) Patent No.: US 12,535,845 B2
(45) Date of Patent: Jan. 27, 2026

(54) KNOB CONFIGURED FOR TORQUE CONTROL

(71) Applicant: Orthosoft ULC, Montreal (CA)

(72) Inventors: Michael Reimeringer, Montreal (CA); Rémi Paquet, Bromont (CA); Sharif Sharifzadeh, Longueuil (CA); Ronan Lacour, Montreal (CA); Yann Zimmerman, Montreal (CA)

(73) Assignee: Orthosoft ULC

( * ) Notice: Subject to any disclaimer, the term of this patent is extended or adjusted under 35 U.S.C. 154(b) by 0 days.

(21) Appl. No.: 18/939,127

(22) Filed: Nov. 6, 2024

(65) Prior Publication Data

US 2025/0172962 A1 May 29, 2025

Related U.S. Application Data

(60) Provisional application No. 63/603,831, filed on Nov. 29, 2023.

(51) Int. Cl.
*G05G 1/10* (2006.01)
*A61B 34/20* (2016.01)
*F16D 7/04* (2006.01)

(52) U.S. Cl.
CPC ............... *G05G 1/10* (2013.01); *A61B 34/20* (2016.02); *F16D 7/044* (2013.01); *A61B 2034/2055* (2016.02)

(58) Field of Classification Search
CPC ....................................................... G05G 1/10
See application file for complete search history.

(56) References Cited

U.S. PATENT DOCUMENTS

| | | | |
|---|---|---|---|
| 8,337,503 | B2 | 12/2012 | Lian |
| 8,884,618 | B2 | 11/2014 | Mahfouz |
| 9,675,461 | B2 | 6/2017 | Mahfouz |
| 11,490,969 | B2 | 11/2022 | Brummund et al. |
| 2016/0361071 | A1 | 12/2016 | Mahfouz |
| 2017/0312035 | A1 | 11/2017 | May et al. |
| 2021/0267611 | A1 | 9/2021 | Hart et al. |

*Primary Examiner* — Daniel D Yabut
(74) *Attorney, Agent, or Firm* — SCHWEGMAN LUNDBERG & WOESSNER, P.A.

(57) ABSTRACT

A knob including an outer housing, a first magnet, a second magnet, a first crown and a second crown. The second magnet and the first magnet are configured to exert a repulsive force with respect to one another. The first crown positioned within the outer housing and restrained from translation relative to the outer housing. The second crown is coupled to the second magnet. The second crown is rotatable with the outer housing. The second crown has a second plurality of teeth on a second side thereof that interface with and selectively engage the first plurality of teeth on the first side of the first crown. The second crown overcomes the repulsive force between the first magnet and the second magnet and translates relative to the outer housing and the first crown when the first crown is threaded onto the first medical instrument to a predetermined torque.

20 Claims, 8 Drawing Sheets

KNOB CONFIGURED FOR TORQUE CONTROL

CLAIM OF PRIORITY

This application claims the benefit of U.S. Provisional Patent Application Ser. No. 63/603,831, filed on Nov. 29, 2023, the benefit of priority of which is claimed hereby, and which is incorporated by reference herein in its entirety.

TECHNICAL FIELD

The present disclosure is directed to medical instruments and methods for use in performing an arthroplasty, such as a hip, knee, shoulder or another type of arthroplasty.

BACKGROUND

In computer-assisted surgery procedures, an optical tracking system is often used to track various objects, such as patient anatomy, medical instruments, robotic components, or the like. In an optical tracking system, an optical camera may be used in an operating room to detect reflective trackers for the duration of a procedure. Such tracking can be utilized with robotic surgical systems and in traditional surgery.

Total hip arthroplasties and total shoulder arthroplasties can be complicated procedures that utilize a plurality of different medical instruments that are switched during the procedure and result in the anatomy being repositioned throughout the procedure. U.S. Pat. No. 8,337,503 to Lian and United States Pub. No. US 2016/0361071 to Mahfouz describe cutting guides and medical instruments for use in a total replacement surgery. U.S. Pat. No. 11,490,969 to Brummund and United States Pub. No. US 2021/0267611 to Hart describe systems and methods for tracking medical instruments and anatomy during a robotic surgical arthroplasty procedure.

Overview

The present inventors have recognized, among other things, that one problem to be solved with traditional total and partial arthroplasties involves tracking anatomy (e.g., an ankle, knee, hip, shoulder joint or particular bone(s)) to ensure proper orientation and alignment of relevant anatomy to receive a prosthetic implant. In particular, the present inventors have recognized that reference frame assemblies (tracking elements) traditionally used, including those that utilize an optical tracker or those configured to be registered by a probe can become loose or decoupled from a base component coupled to patient anatomy if not properly screwed down with adequate torque. If these components become loosened or decoupled, tracking can be interrupted and the position of the relevant anatomy (or instrument or robotic component) can be inaccurate or can be lost necessitating re-registration, which can take time and interrupt the flow of the procedure.

As an example, during a hip arthroplasty a knob can couple an optical tracker to a base to identify a position of a patient's pelvis. However, the knob can become loose or unscrewed such as during surgical impaction of the prosthetic implant into the pelvis. As a result of the loosening or unscrewing of the knob, the position of the pelvis becomes inaccurate due to a shift in position of the optical tacker. On the other hand, if the optical tracker is coupled to the base component with too much torque, threads can become stripped and/or it can be difficult to decouple the components for reuse. With these problems in mind, the present inventors propose a knob that can control torque such that a first portion of the knob can be threaded to an instrument (e.g., a base component, a robotic component, etc.) with a predetermined torque. Once the predetermined torque is achieved, the knob can be configured to decouple the first portion of the knob threaded to the instrument from further torque applied by turning the knob so that over-torquing of the first portion cannot occur. Additionally, the knob can be configured to make an audible noise upon achieving the predetermined torque such that a surgeon or other personnel will know 1) that the predetermined torque has not yet been achieved as no audible noise has yet been heard and 2) that the predetermined torque has been achieved upon hearing of the audible noise. The proposed knob has many benefits as it can reduce inaccuracy due to loosening or decoupling of the knob. The proposed knob can thus reduce surgical time, reduce error due to inaccuracy and reduce surgical complexity (e.g., by not having to interrupt surgical flow for re-registering anatomy or instruments).

It is understood that although the present knob is described in the context of coupling a first medical instrument to a second medical instrument, the knob has other applications including in coupling an instrument to a robotic surgical device, linking components of a robotic surgical device, linking other instruments not specifically shown or the like. Thus, the term "instrument" should be interpreted broadly herein and not limited to the specific reference frame assembly described herein and need not be limited to the specific example described. Additionally, the term "reference frame assembly" or similar terms should be interpreted broadly to cover all types of reference frames not just optical reference frames described herein. Furthermore, it should be understood that the present knob although described in regards to a robotic surgical arthroplasty can be utilized in a traditional surgical arthroplasty or another medical procedure entirely.

The term "adjacent" refers to the relative position of two elements, such as, for example, two medical instruments, that are close to each other and may or may not be necessarily in contact with each other as understood by the context in which "adjacent" appears.

The term "ferrimagnetic" refers to materials that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials can be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly in magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "magnet" can include a ferromagnetic material that responds to a magnetic field and acts as a magnet. "Magnet" can be any material that exerts a magnetic field or can be acted upon by a magnetic field in either a permanent, semi-permanent, or temporary state. The term "magnet" can be one individual magnet or an assembly of magnets that would act like a single magnet. The term "magnet" can include permanent magnets and electromagnets.

The term "ferromagnetic" refers to materials that exhibit ferromagnetism. Ferromagnetism is a physical phenomenon in which certain electrically uncharged materials strongly attract others. In contrast to other substances, ferromagnetic materials are magnetized easily, and in strong magnetic fields the magnetization approaches a definite limit called saturation. When a field is applied and then removed, the magnetization does not return to its original value. This phenomenon is referred to as hysteresis. When heated to a certain temperature called the Curie point, which is generally different for each substance, ferromagnetic materials lose their characteristic properties and cease to be magnetic; however, they become ferromagnetic again on cooling.

The terms "magnetic" and "magnetized" mean being ferromagnetic or ferrimagnetic at 20° C., unless otherwise specified.

The term "magnetizable" means that the item being referred to is magnetic or can be made magnetic using an applied magnetic field and has a magnetic moment of at least 0.001 electromagnetic units (emu), in some cases at least 0.005 emu, and yet other cases 0.01 emu, up to an including 0.1 emu, although this is not a requirement. The term "magnetizable" means capable of being magnetized or already in a magnetized state.

The term "magnetic field" refers to magnetic fields that are not generated by any astronomical body or bodies (e.g., Earth or the sun). In general, magnetic fields used in practice of the present disclosure have a field strength of at least about 10 gauss (1 mT), in some cases at least about 100 gauss (10 mT), and in yet other cases at least about 1000 gauss (0.1 T), and in yet other cases at least about 10,000 gauss (1.0 T).

The term "repulsive force" in the context of the present application means a magnetic force that is opposite of an "attractive force". The repulsive force is the force acting between a first magnet and a second magnet having a same pole interfacing orientation (e.g., North-North or South-South interfacing), the force acting to separate or to try to separate the first magnet and a second magnet a further distance away from one another.

The term "substantially" means within 20 percent (in some cases within 15 percent, in yet other cases within 10 percent, and in yet other cases within 5 percent) of the attribute being referred to. Thus, a value A is "substantially similar" to a value B if the value A is within plus/minus one or more of 5%, 10%, 20% of the value A.

Features and advantages of the present disclosure will be further understood upon consideration of the detailed description as well as the appended claims.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

This overview is intended to provide an overview of subject matter of the present patent application. It is not intended to provide an exclusive or exhaustive explanation of the invention. The detailed description is included to provide further information about the present patent application.

DETAILED DESCRIPTION

Figure 1:
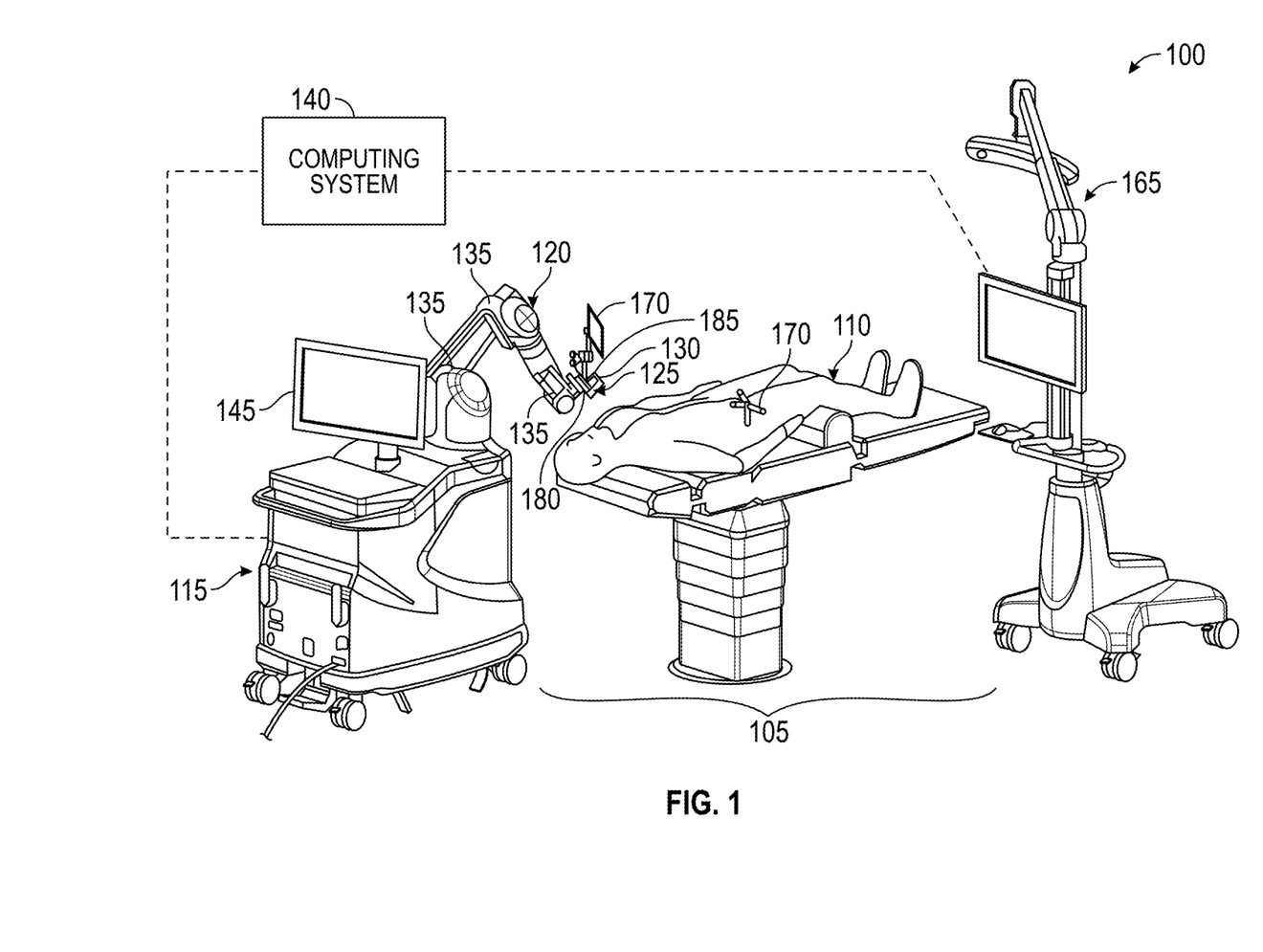
FIG. 1 is a diagrammatic view of an operating room including a robot-assisted surgical system comprising a robotic arm, a computing system and a tracking system.

FIG. 1 illustrates surgical system 100 for operation on surgical area 105 of patient 110 in accordance with at least one example of the present disclosure. Surgical area 105 in one example can include a joint and, in another example, can be a bone. Surgical area 105 can include any surgical area of patient 110, including but not limited to the shoulder, head, elbow, thumb, spine, and the like. Surgical system 100 can also include robotic system 115 with one or more robotic arms, such as robotic arm 120. As illustrated, robotic system 115 can utilize only a single robotic arm. Robotic arm 120 can be a 6 degree-of-freedom (DOF) robot arm, such as the ROSA® robot from Medtech, a Zimmer Biomet Holdings, Inc. company. In some examples, robotic arm 120 is cooperatively controlled with surgeon input on the end effector or surgical medical instrument, such as surgical medical instrument 125. In other examples, robotic arm 120 can operate autonomously. While not illustrated in FIG. 1, one or more positionable surgical support arms can be incorporated into surgical system 100 to assist in positioning and stabilizing medical instruments or anatomy during various procedures.

Each robotic arm 120 can rotate axially and radially and can receive a surgical medical instrument, or end effector, 125 at distal end 130. Surgical medical instrument 125 can be any surgical medical instrument adapted for use by the robotic system 115, including, for example, a guide tube, a holder device, a gripping device such as a pincer grip, a burring device, a reaming device, an impactor device such as a humeral head impactor, a pointer, a probe, an medical instrument guide, an medical instrument holder or a universal medical instrument adapter device as described herein or the like. Surgical medical instrument 125 can be positionable by robotic arm 120, which can include multiple robotic joints, such as joints 135, that allow surgical medical instrument 125 to be positioned at any desired location adjacent or within a given surgical area 105.

Robotic system 115 can also include computing system 140 that can operate robotic arm 120 and surgical medical instrument 125. Computing system 140 can include at least memory, a processing unit, and user input devices, as will be described herein. Computing system 140 and tracking system 165 can also include human interface devices 145 for providing images for a surgeon to be used during surgery. Computing system 140 is illustrated as a separate standalone system, but in some examples computing system 140 can be integrated into robotic system 115. Human interface devices 145 can provide images, including but not limited to three-dimensional images of bones, glenoid, joints, and the like. Human interface devices 145 can include associated input mechanisms, such as a touch screen, foot pedals, or other input devices compatible with a surgical environment.

Computing system 140 can receive pre-operative, intra-operative and post-operative medical images. These images can be received in any manner and the images can include, but are not limited to, computed tomography (CT) scans, magnetic resonance imaging (MRI), two-dimensional x-rays, three-dimensional x-rays, ultrasound, and the like. These images in one example can be sent via a server as files attached to an email. In another example the images can be stored on an external memory device such as a memory stick and coupled to a USB port of the robotic system to be uploaded into the processing unit. In yet other examples, the images can be accessed over a network by computing system 140 from a remote storage device or service.

After receiving one or more images, computing system 140 can generate one or more virtual models related to surgical area 105. Alternatively, computer system 140 can receive virtual models of the anatomy of the patient prepared remotely. Specifically, a virtual model of the anatomy of patient 110 can be created by defining anatomical points within the image(s) and/or by fitting a statistical anatomical model to the image data. The virtual model, along with virtual representations of implants, can be used for calculations related to the desired location, height, depth, inclination angle, or version angle of an implant, stem, acetabular cup, glenoid cup, total ankle prosthetic, surgical medical instrument, or the like to be utilized in surgical area 105. In another procedure type, the virtual model can be utilized to determine resection locations. In a specific example, the virtual model can be used to determine a reaming angle relative to an acetabulum of a pelvis and a depth for reaming into the pelvis to place an acetabular implant. The virtual model can also be used to determine bone dimensions, implant dimensions, bone fragment dimensions, bone fragment arrangements, and the like. Any model generated, including three-dimensional models, can be displayed on human interface devices 145 for reference during a surgery or used by robotic system 115 to determine motions, actions, and operations of robotic arm 120 or surgical medical instrument 125. Known techniques for creating virtual bone models can be utilized, such as those discussed in U.S. Pat. No. 9,675,461, titled "Deformable articulating templates" or U.S. Pat. No. 8,884,618, titled "Method of generating a patient-specific bone shell" both by Mohamed Rashwan Mahfouz, as well as other techniques known in the art.

Computing system 140 can also communicate with tracking system 165 that can be operated by computing system 140 as a stand-alone unit. Surgical system 100 can utilize the Polaris optical tracking system from Northern Digital, Inc. of Waterloo, Ontario, Canada. Additionally, tracking system 165 can comprise the tracking system shown and described in Pub. No. US 2017/0312035, to Brian M. May, and/or U.S. Pat. No. 11,490,969B2 to Martin Brummund, the discloses of which are hereby incorporated by this reference in their entirety. Tracking system 165 can monitor a plurality of tracking elements, such as tracking elements 170, affixed to objects of interest including selected anatomy, selected instruments, portions or parts of the robotic surgical system to track locations of multiple objects within the surgical field. Tracking system 165 can function to create a virtual three-dimensional coordinate system within the surgical field for tracking patient anatomy, surgical medical instruments, or portions of robotic system 115. Tracking elements 170 can be tracking frames including multiple IR reflective tracking spheres, or similar optically tracked marker devices. In one example, tracking elements 170 can be placed on or adjacent one or more bones of patient 110. In other examples, tracking elements 170 can be placed on robot robotic arm 120, surgical medical instrument 125, and/or an implant to accurately track positions within the virtual coordinate system associated with surgical system 100. In each instance tracking elements 170 can provide position data, such as patient position, bone position, joint position, robotic arm position, implant position, or the like.

Robotic system 115 can include various additional sensors and guide devices. For example, robotic system 115 can include one or more force sensors, such as force sensor 180. Force sensor 180 can provide additional force data or information to computing system 140 of robotic system 115. Force sensor 180 can be used by a surgeon to cooperatively move robotic arm 120. For example, force sensor 180 can be used to monitor impact or implantation forces during certain operations, such as insertion of an implant stem into a humeral canal. Monitoring forces can assist in preventing negative outcomes through force fitting components. In other examples, force sensor 180 can provide information on soft-tissue tension in the tissues surrounding a target joint. In certain examples, robotic system 115 can also include laser pointer 185 that can generate a laser beam or array that is used for alignment of implants during surgical procedures.

In order to ensure that computing system 140 is moving robotic arm 120 in a known and fixed relationship to surgical area 105 and patient 110, the space of surgical area 105 and patient 110 can be registered to computing system 140 via a registration process involving registering fiducial markers attached to patient 110 with corresponding images of the markers in patient 110 recorded preoperatively or just prior to a surgical procedure. For example, a plurality of fiducial markers can be attached to patient 110, images of patient 110 with the fiducial markers can be taken or obtained and stored within a memory device of computing system 140. Subsequently, patient 110 with the fiducial markers can be moved into, if not already there because of the imaging, surgical area 105 and robotic arm 120 can touch each of the fiducial markers. Engagement of each of the fiducial markers can be cross-referenced with, or registered to, the location of the same fiducial marker in the images. In additional examples, patient 110 and medical images of the patient can be registered in real space using contactless methods, such as by using a laser rangefinder held by robotic arm 120 and a surface matching algorithm that can match the surface of the patient from scanning of the laser rangefinder and the surface of the patient in the medical images. As such, the real-world, three-dimensional geometry of the anatomy attached to the fiducial markers can be correlated to the anatomy in the images and movements of medical instruments 125 attached to robotic arm 120 based on the images will correspondingly occur in surgical area 105.

Subsequently, other medical instruments and devices attached to surgical system 100 can be positioned by robotic arm 120 into a known and desired orientation relative to the anatomy. For example, robotic arm 120 can be coupled to universal medical instrument adapter, that allows multiple medical instruments to be attached to robotic arm without having to individually couple each medical instrument to robotic arm in succession and without the need for individually registering each attached medical instrument with the coordinate system. Robotic arm 120 can move relative to anatomy of the patient such that the surgeon can, after adding and removing other medical instruments to the adapter as needed, perform the desired interaction with the patient at specific locations called for by the surgical plan with the attached medical instruments.

Figure 2:
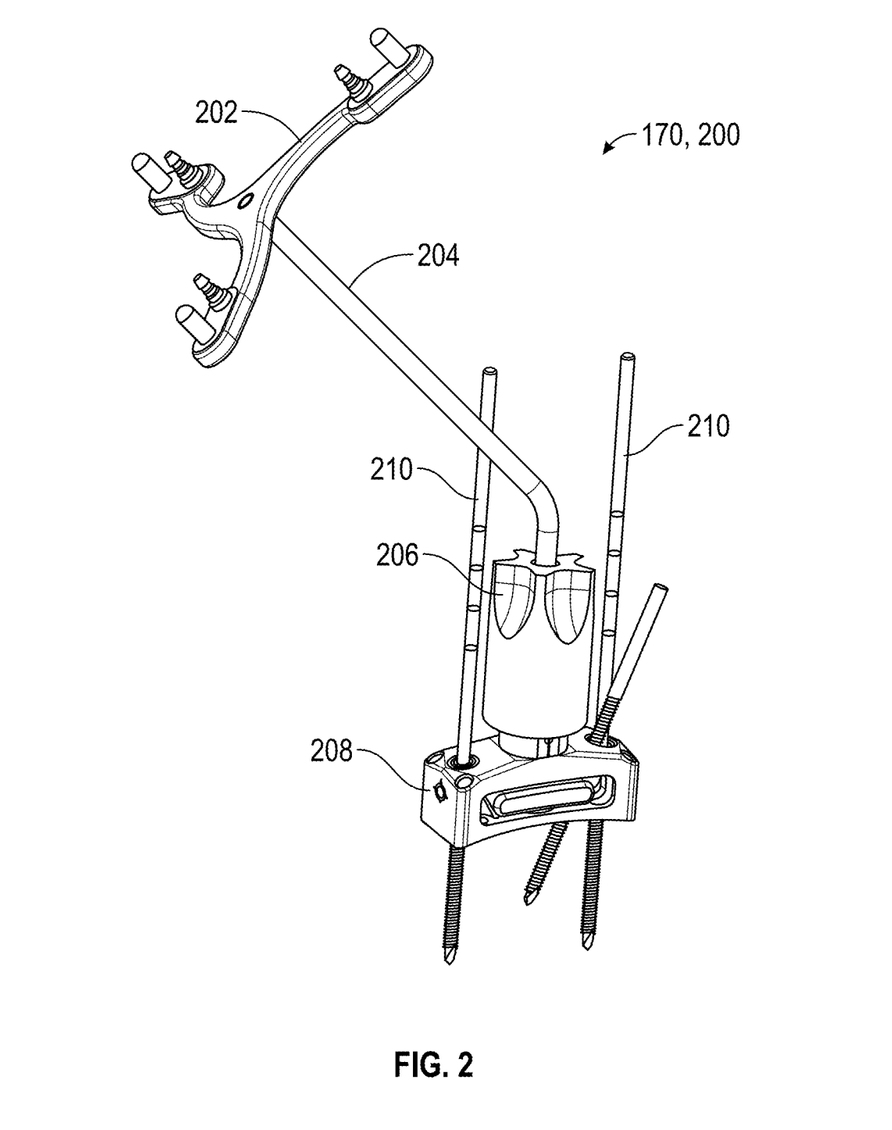
FIG. 2 is a perspective view of the reference frame assembly including an optical tracker, rod or other linkage member, a knob and a base according to an example of the present application.

FIG. 2 shows an example of a tracking element 170 that is used in an arthroplasty and can be coupled to an anatomy of a patient such as a bone or joint. The tracking element 170 is referred to hereinafter as a reference frame assembly 200. The reference frame assembly 200 can include an optical tracker 202, a rod 204, a knob 206, a base 208 and one or more fixation elements 210.

The rod 204 can be coupled to the optical tracker 202. The rod 204 can extend from the optical tracker 202 and can be selectively coupled to the base 208 by the knob 206 as further described herein. The base 208 can be configured to receive the one or more fixation elements 210, which can be inserted into bone or other anatomy of the patient at a desired location. The reference frame assembly 200 can have a known shape, size and indicia that can be used in tracking the location and/or identifying the anatomy the reference frame assembly 200 is coupled to.

The optical tracker 202 of FIG. 2 can include multiple IR reflective tracking spheres, or similar optically tracked marker devices as discussed previously. The rod 204 can extend through at least a portion of the knob 206 and can be positioned adjacent and/or abutting the base 208. The base 208 can be configured for coupling to an anatomy of a patient (e.g., can be shaped, sized and have features such as apertures, fixation element(s) or the like). In the example shown the base 208 has one or more apertures configured to receive the one or more fixation elements 210. The one or more fixation elements 210 can be bone screws, K-wire, pins or other known elements configured for fixation to anatomy such as bone.

Figure 2A:
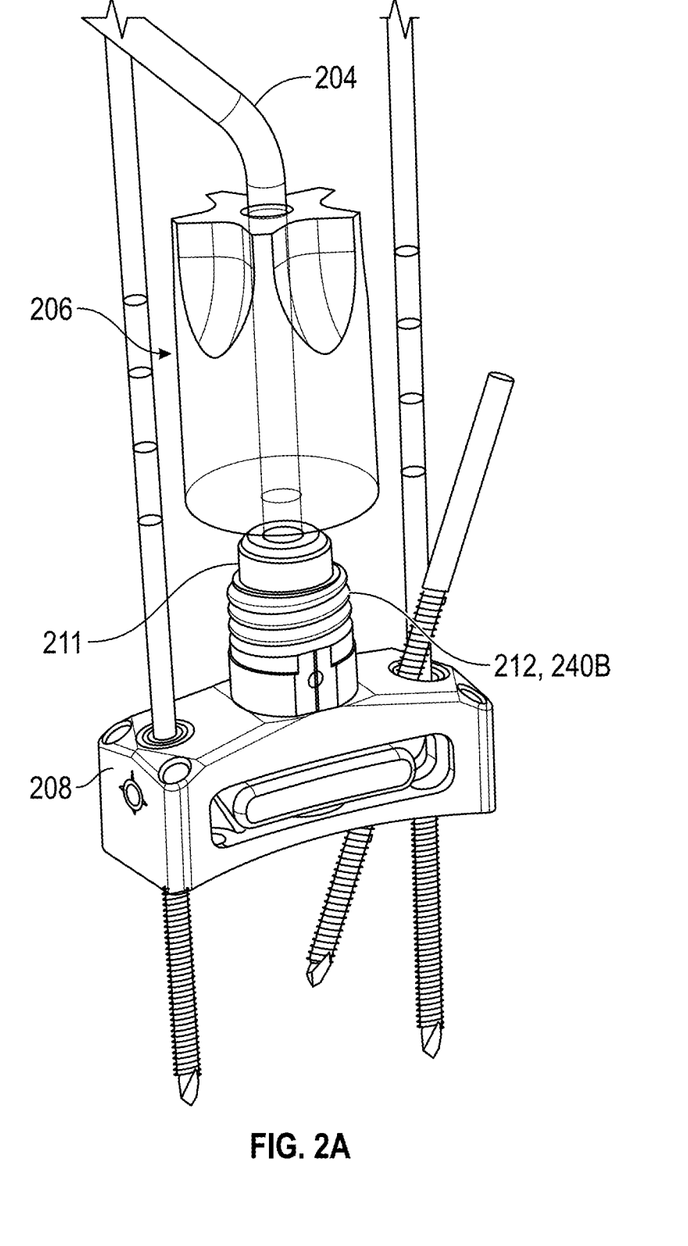
FIG. 2A is a perspective view of the reference frame assembly of FIG. 2 with the knob uncoupled from attachment between the rod and the base according to an example of the present application.

FIG. 2A shows the knob 206 uncoupled from the base 208 and selectively moved up the rod 204, which now extends entirely through the knob 206 in the position of FIG. 2A. FIG. 2A additionally shows the relationship of an end portion 211 of the rod 204 relative to a threaded portion 212 of the base 208. As discussed, the end portion 211 can be positioned to generally align with and can be adjacent or abutting the threaded portion 212. This relationship of the rod 204 and the base 208 can be maintained by the knob 206 when threaded down onto the threaded portion 212 and capturing the end portion 211 so as to couple rod 204 with the base 208 as previously shown in FIG. 2.

Figure 3:
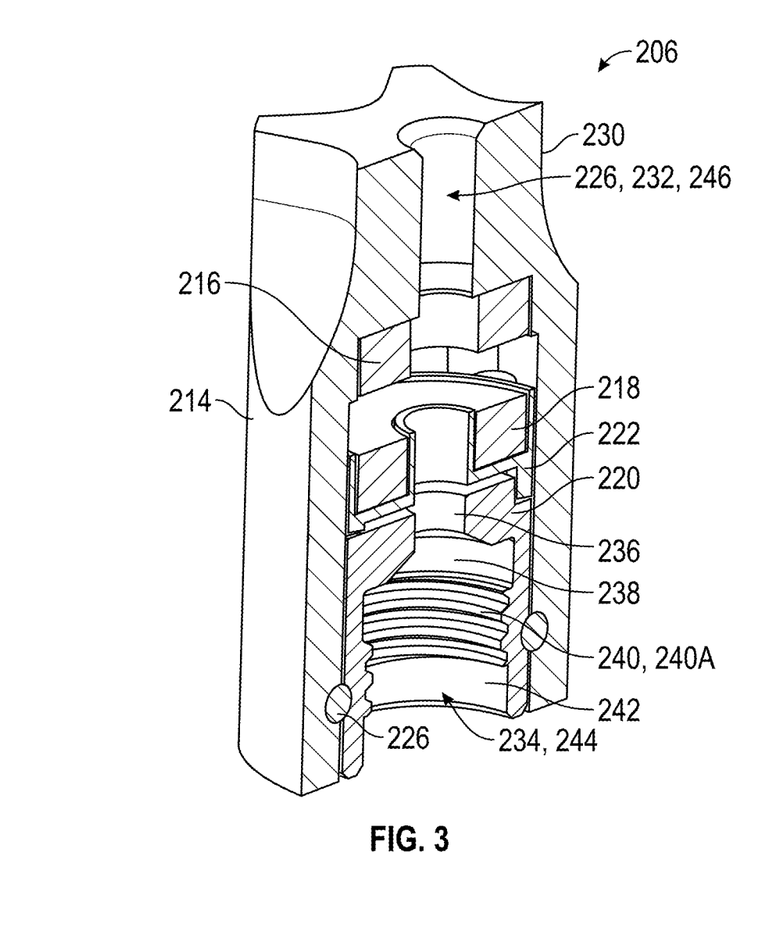
FIG. 3 is a cross-sectional view of a knob showing components thereof according to an example of the present application.
Figure 3A:
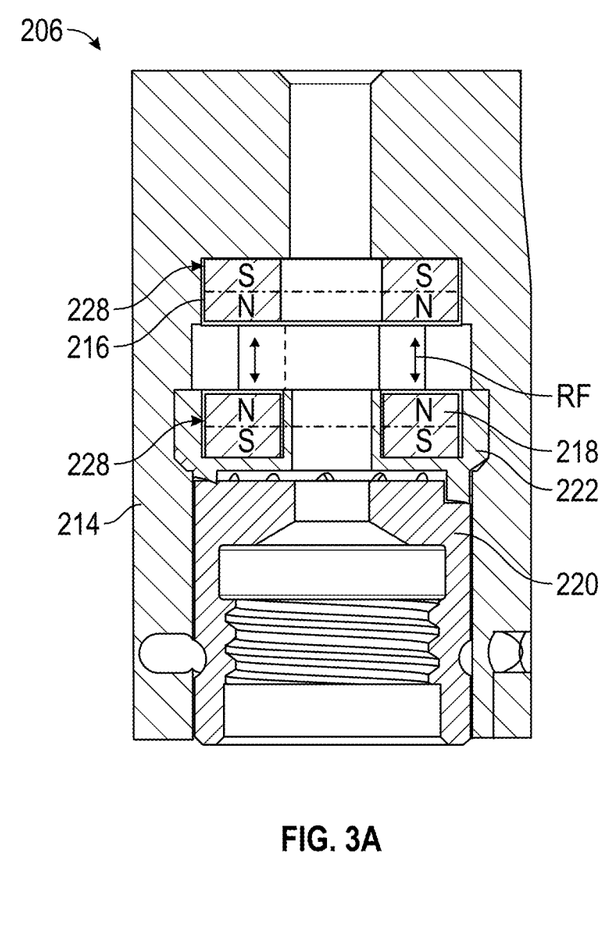
FIG. 3A is a cross-sectional view of the knob of FIG. 3 showing an orientation of the poles of a first magnet relative to a second magnet to produce a repulsive force between the first magnet and the second magnet.

FIGS. 3 and 3A are a cross-sectional views of the knob 206 according to one example. The knob 206 can include an outer housing 214, a first magnet 216, a second magnet 218, a first crown 220, a second crown 222, a passageway 224 and locking pins 226. FIG. 3A illustrates an exemplary orientation of poles 228 (e.g., arranged N-N facing) of the first magnet 216 and the second magnet 218 to provide a repulsive force RF therebetween.

Referring now to FIG. 3, the outer housing 214 can include a handle portion 230. The passageway 224 can include a plurality of apertures 232 and a recess 234. The first crown 220 can include the recess 234 and an aperture 236 (one of the plurality of apertures 232). The recess 234 can include a first portion 238, a threaded portion 240 and a second portion 242.

The outer housing 214 can form a recess 244 configured to receive the first magnet 216, the second magnet 218, the first crown 220, the second crown 222, portions of passageway 224 and the locking pins 226 therein. The recess 244 can be surrounded by wall(s) and can have an enlarged opening at a first end and a smaller aperture 246 (one of the plurality of apertures 232) forming a second opening at an opposing second end. The handle portion 230 can be at and adjacent the second end and can be configured for grasping and turning of the knob 206.

The first magnet 216 can have a central aperture (one of the plurality of apertures 232) and can be coupled (e.g., glued or otherwise affixed) to the outer housing 214 within the recess 244. The first magnet 216 can interface with the second magnet 218 such as in the pole relationship to have the repulsive force RF shown in FIG. 3A. The second magnet 218 can be spaced from the first magnet 216 by a gap. This gap can change in distance as further discussed herein but can be maintained by the repulsive force RF (FIG. 3A) between the first magnet 216 and the second magnet 218. The second magnet 218 can be coupled (e.g., glued or otherwise affixed) to the second crown 222. As an example, the second magnet 218 can be received in a recess of the second crown 222. However, other examples do not contemplate the use of a recess in the second crown 222 for the second magnet 218. According to some examples, the second crown 222 could be configured as the second magnet 218 such that the components could be combined as a single component. The present application illustrates the second magnet 218 and the second crown 222 as two separate components merely for exemplary purposes and it should be understood that according to some examples these components can be combined as a single component.

The second crown 222 can be received in the recess 244. The first crown 220 can be spaced on an opposing side of the second crown 222 from the second magnet 218. The first crown 220 can be coupled to the outer housing 214 by the locking pins 226. The locking pins 226 can substantially maintain an axial position of the first crown 220 relative to the outer housing 214 such that the first crown 220 cannot translate axially (e.g., along the passageway 224 and within the recess 244) relative to the outer housing 214.

The first crown 220 can be positioned such as held by the locking pins 226 adjacent the first opening of the recess 244. The aperture 236 can be defined by the first crown 220 and can communicate with the recess 234. The recess 234, in particular the first portion 238, can be configured to receive the end portion 211 (FIG. 2A) of the rod 204 (FIG. 2A). The end portion 211 (FIG. 2A) can be captured by the first crown 220 so as to be is substantially aligned with and positioned adjacent to corresponding threads 240B of the base 208 when the first crown 220 is threaded onto the base 208 to a predetermined torque as further discussed herein.

The recess 234 defined by the first crown 220 can communicate and can form part of the first opening for the recess 244. The second portion 242 can be positioned immediately adjacent and can form part of the first opening. The threaded portion 240 can be positioned between the second portion 242 and the first portion 238. The threaded portion 240 can include threads 240A. These threads 240A can be ⅝"-11 UNC for example. The threads 240A of the threaded portion 240 can be configured to mate with corresponding threads 240B of the threaded portion 212 (FIG. 2A) of the base 208 when the knob 206 is threaded down onto the base 208 as such as shown in FIG. 2. The second portion 242 can be configured to receive a portion of the base distal of the threaded portion 212.

Figure 4:
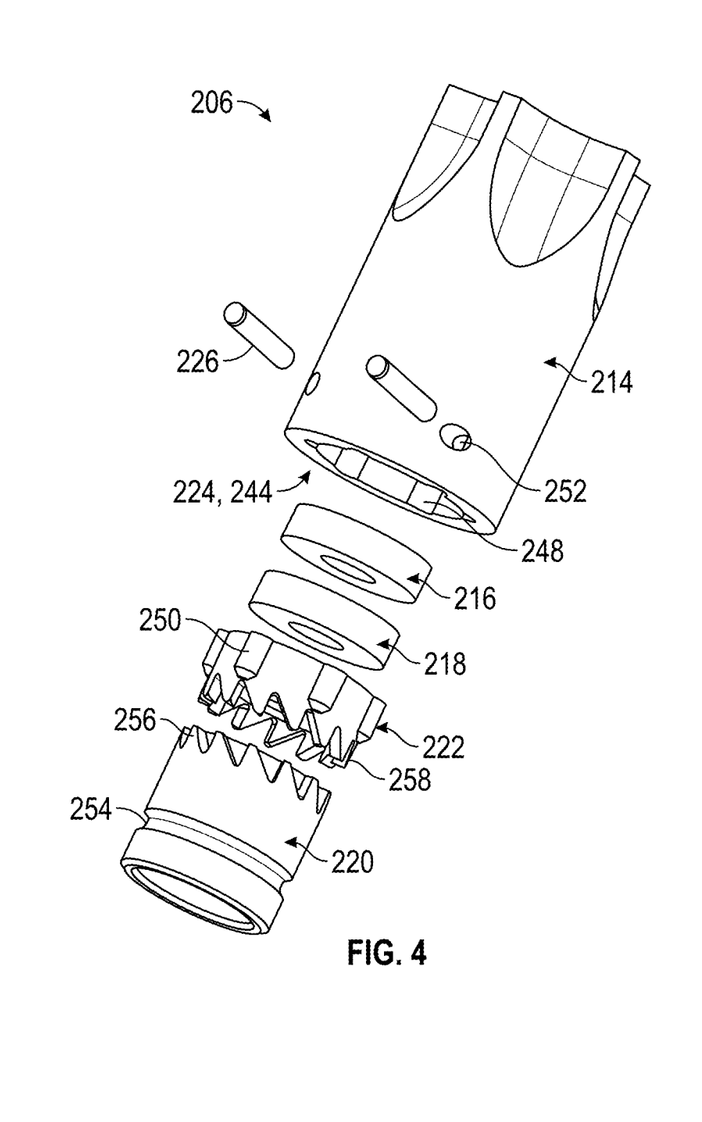
FIG. 4 is an exploded view of the knob of FIGS. 3 and 3A showing the components thereof according to an example of the present application.

FIG. 4 shows an exploded view of the knob 206 including the outer housing 214, the first magnet 216, the second magnet 218, the first crown 220, the second crown 222, the passageway 224, the locking pins 226 and the recess 244 as previously discussed. FIG. 4 additionally shows further features as discussed below.

In addition to the recess 244, the outer housing 214 includes grooves 248. The grooves 248 extend axially along a longitudinal length of the outer housing 214 and communicate with the recess 244. The grooves 248 are spaced from one another around the circumference of the recess 244.

The second crown 222 can include lugs 250. The lugs 250 can be projections around a circumference of the second crown 222. The lugs 250 are configured to be received by the grooves 248 of the outer housing 214. This arrangement allows for co-rotation of the second crown 222 with the outer housing 214 during operation of the knob 206 as further discussed herein. Additionally, the configuration of the lugs 250 and the grooves 248 (the second crown 222 and the outer housing 214) allows for translation of the second crown 222 axially along part of the longitudinal length of the outer housing 214 within the recess 244 as further discussed and illustrated. Put another way, the lugs 250 can engage with the outer housing 214 to prevent rotation of the second crown 222 relative to the outer housing 214. Rather the second crown 222 and outer housing 214 are coupled by the lugs 250 and grooves 248 for co-rotation. However, the grooves 248 can provide a channel in the outer housing 214 that allows for lugs 250 to translate therein.

FIG. 4 additionally illustrates apertures 252 extending through sides of outer housing 214. The apertures 252 are configured to receive the locking pins 226. The apertures 252 can communicate with the recess 244 but can be oriented so as to pass through the outer housing 214 but not intersect with a centerline axis of the recess 244.

The first crown 220 can include a groove 254 extending around an outer circumference thereof. The groove 254 can be configured to receive a portion of the locking pins 226 therein. Thus, the groove 254 can be generally aligned with the apertures 252 when the first crown 220 is inserted into the recess 244 as previously illustrated in FIGS. 3 and 3A. The locking pins 226 can be captured by the groove 254 and by the outer housing 214 and can restrain translation of the first crown 220 relative to the outer housing 214 as previously discussed. The groove 254 and locking pin 226 arrangement can allow for rotation of the first crown 220 with the outer housing 214 as further discussed.

FIG. 4 shows a first plurality of teeth 256 of the first crown 220 and a second plurality of teeth 258 of the second crown 222. The first plurality of teeth 256 are arranged along a first side (and can form an end) of the first crown 220. The second plurality of teeth 258 can be on a second side (and can form an end) of the second crown 222. The second plurality of teeth 258 can be configured to interface with and can selectively engage the first plurality of teeth 256 on the first side of the first crown 220.

Figure 5:
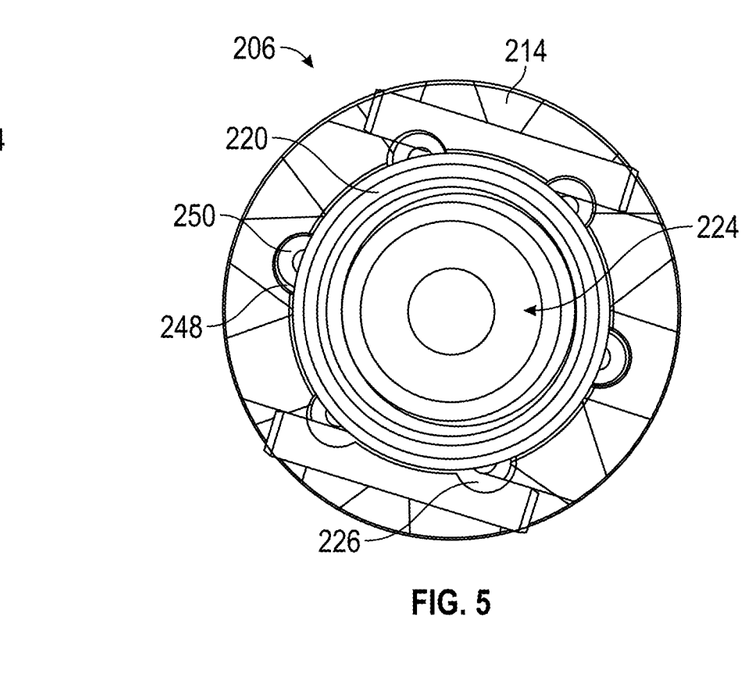
FIG. 5 is a plan view of a first end of the knob showing a passageway extending entirely therethrough according to an example of the present application.

FIG. 5 shows the first end of the knob 206 including the first end of the outer housing 214 with the passageway 224 extending entirely through the knob 206 from the first end to the second end. A portion of the passageway 224 receives the rod 204 (not shown but see FIGS. 2 and 2A) as previously shown and discussed. FIG. 5 illustrates the corresponding arrangement of the lugs 250 captured by the grooves 248 and portions of the locking pins 226 engaging with the first crown 220.

Figure 6A:
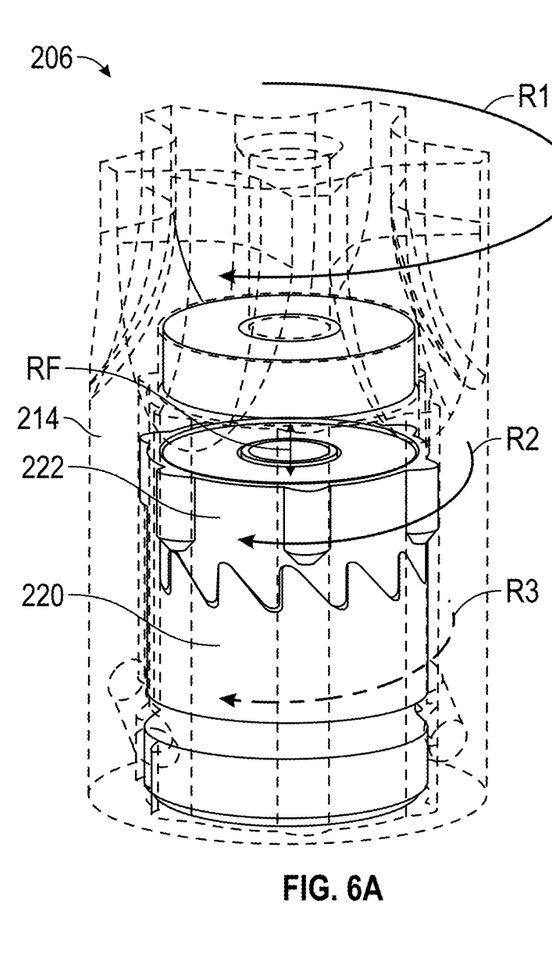
FIG. 6A is a schematic view of the knob being turned prior to a predetermined torque being reached according to an example of the present application.
Figure 6B:
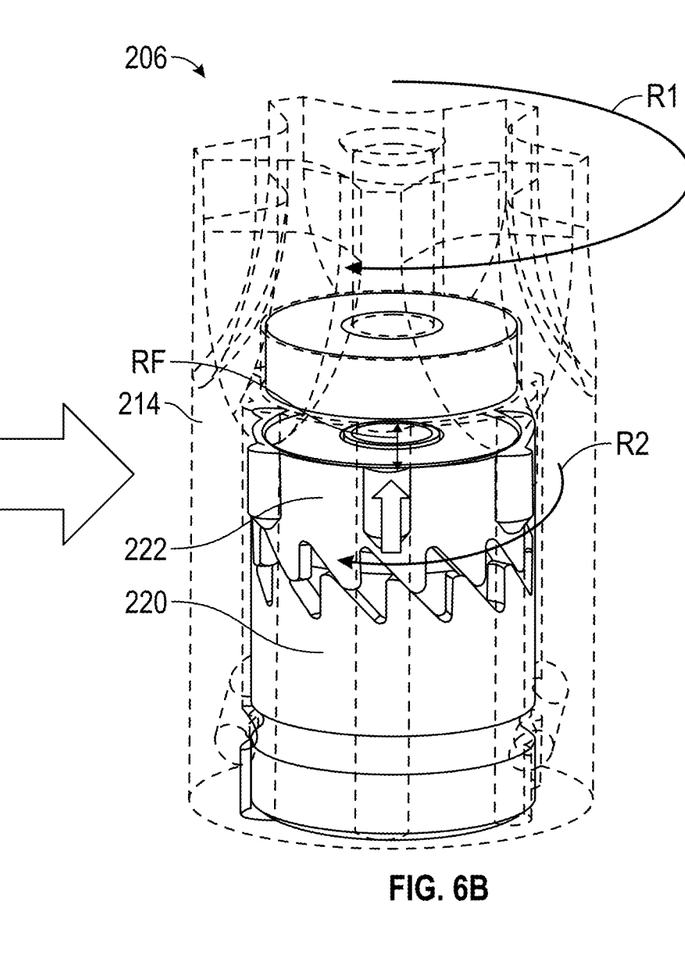
FIG. 6B is a schematic view of the knob of FIG. 6A with a first crown being disconnected for application of torque to another medical instrument after the predetermined torque has been reached.

FIGS. 6A and 6B show an example method of using the knob 206 to control torque applied between the threads 240A (FIG. 3) and the corresponding threads 240B (FIG. 2A) of the base 208 (FIG. 2A). FIG. 6A illustrates torque being applied to rotate (indicated by arrow R1) the outer housing 214 of the knob 206. The second crown 222 co-rotates with the outer housing 214 as indicated by arrow R2. This co-rotation is due to the lugs 250 being captured by the grooves 248 as previously shown in FIG. 5 and discussed in FIGS. 4 and 5. During the co-rotation of the second crown 222 with the outer housing 214, the repulsive force RF between the first magnet 216 and the second magnet 218 engages the second crown 222 with the first crown 220 (in particular engages the second plurality of teeth 258 with the first plurality of teeth 256). As further illustrated in FIG. 6A, the first crown 220 can co-rotate with the turning of the knob 206 (as indicated with arrow R3) via torque transferred from the outer housing 214 to the second crown 222 and from the second crown 222 to the first crown 220.

FIG. 6B shows an example of what occurs when the threads 240A (FIG. 3) are threaded down with the corresponding threads 240B (FIG. 2A) of the base 208 (FIG. 2A) such that a predetermined torque is reached between the threads 240A and the corresponding threads 240B. Once this predetermined torque occurs, the first crown 220 can cease rotation and can become stationary relative to the second crown 222 and the outer housing 214. The second crown 222 and the outer housing 214 can continue to rotate as indicated with arrows R1 and R2. The second crown 222 overcomes the repulsive force RF between the first magnet 216 and the second magnet 218 and translates axially relative to the outer housing 214 and the first crown 220. This allows the second plurality of teeth 258 of the second crown 222 to pass along (e.g., slide along and over) the first plurality of teeth 256 of the first crown 220. Put another way, the repulsive force RF between the first magnet 216 and the second magnet 218 maintains co-rotating engagement of the second plurality of teeth 258 with the first plurality of teeth 256 (as shown in FIG. 6A). However, once the predetermined torque is applied between the threads 240A (FIG. 3) of the first crown 220 and the corresponding threads 240B of the base 208 (FIG. 2A), rotation of the first crown 220 ceases and the second crown 222 can translate as shown in FIG. 6B.

Figure 7A:
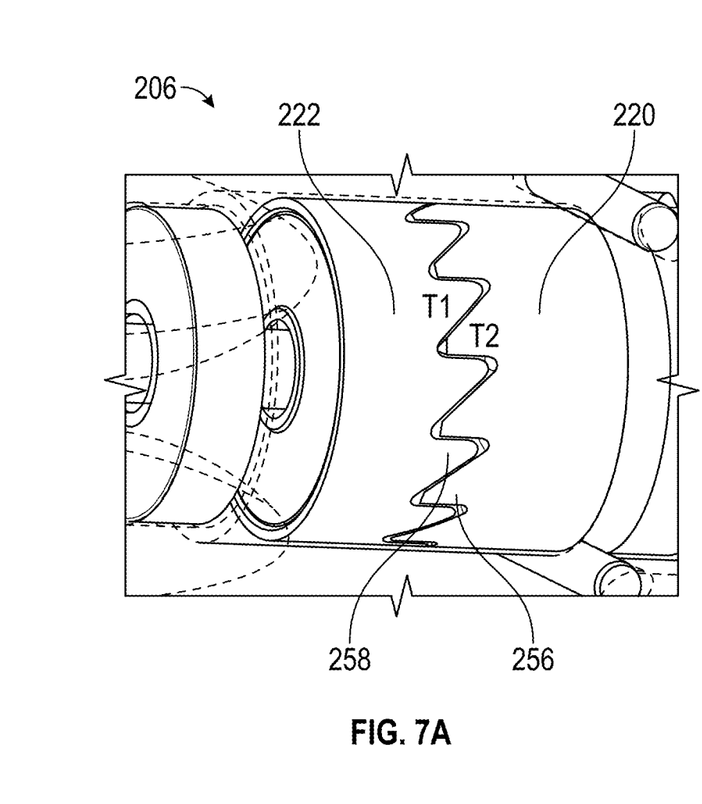
FIGS. 7A-7D schematically illustrate a method by which the knob can produce audible sound (indicia) once the predetermined torque has been reached.

FIGS. 7A-7D show a method by which the knob 206 can produce audible indicia such as a clocking, ticking or clicking sound once the predetermined torque has been reached. FIG. 7A shows the second plurality of teeth 258 of the second crown 222 in a fully engaged position with the first plurality of teeth 256 of the first crown 220. The arrangement of FIG. 7A can be prior to the predetermined torque being achieved such that the first crown 220 is co-rotating with the second crown 222, for example, or can occur after the predetermined torque occurs as described below.

Figure 7B:
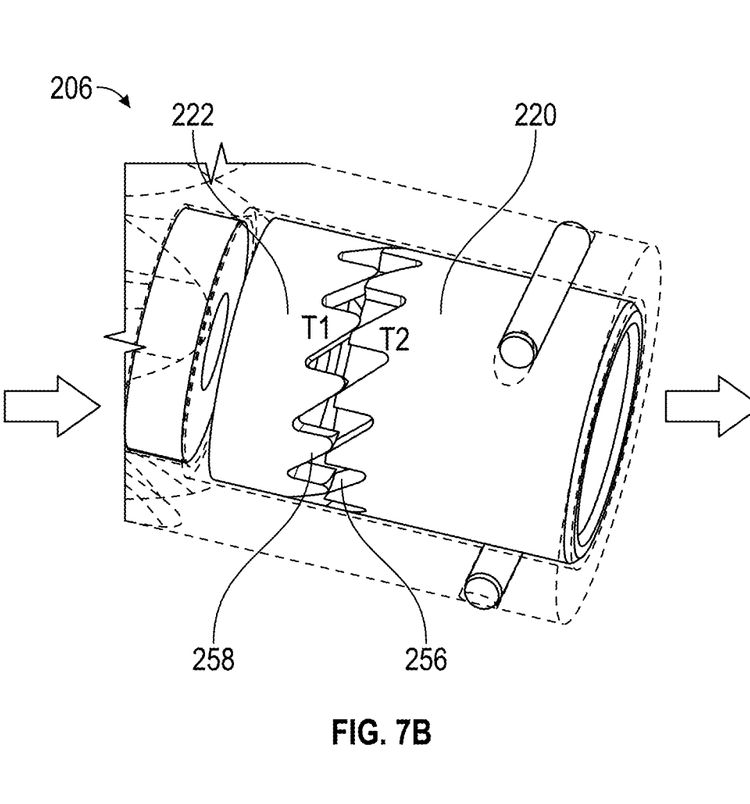
Figure 7C:
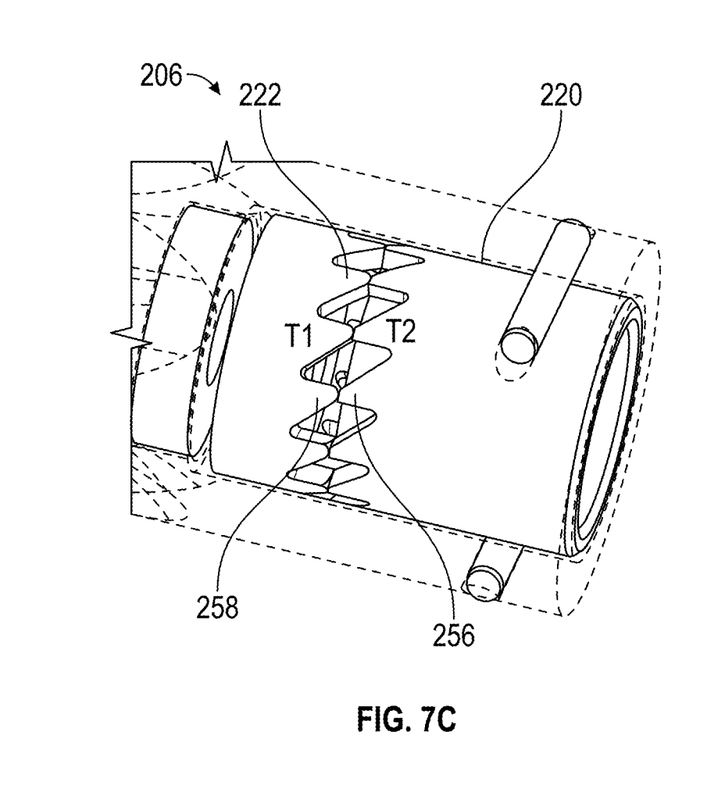
Figure 7D:
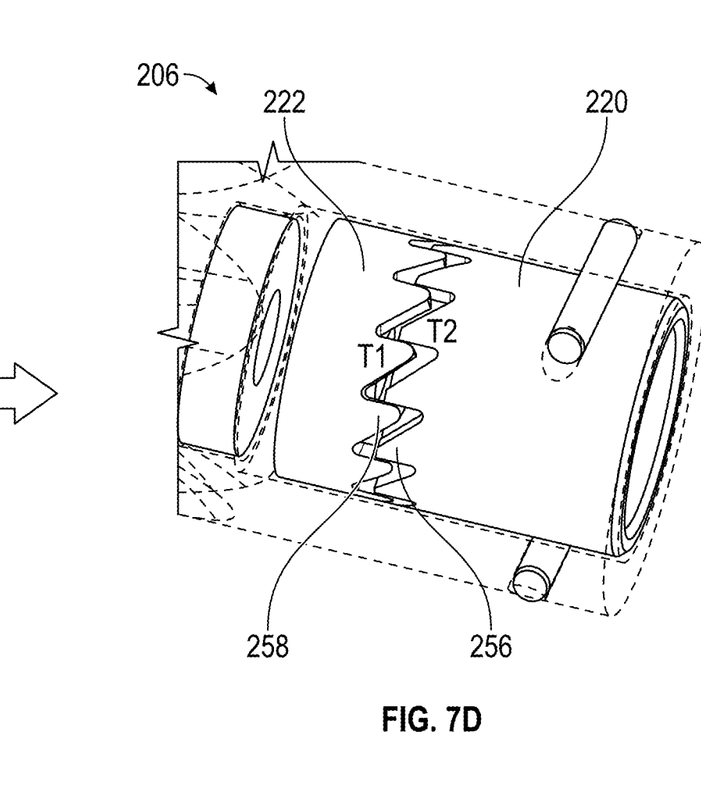

FIG. 7B shows the predetermined torque has been reached, the second plurality of teeth 258 begin to slide along the first plurality of teeth 256. This ramping movement forces the second crown 222 upward against the repulsive magnetic force. FIG. 7C shows the second plurality of teeth 258 have been forced by rotation to a tip engaging position with the first plurality of teeth 256. FIG. 7D shows the second plurality of teeth 258 in the process of falling back into the fully engaged position with the first plurality of teeth 256. The seating of the second plurality of teeth 258 back into the fully engaged position (see FIG. 7A) with the first plurality of teeth 256 can produce the audible noise (indicia) alerting personnel that the predetermined torque has been achieved. The process of FIGS. 7A-7D is illustrated with an exemplary tooth T1 of the second plurality of teeth 258 and an exemplary tooth T2 of the first plurality of tooth T2. This demonstrates how the tooth T1 is ramped (translated) and rotated relative to the tooth T2. Thus, FIGS. 7A-7D illustrate the second plurality of teeth 258 of the second crown 222 can slide along the first plurality of teeth 256 of the first crown from a first fully engaged position (FIG. 7A) to a tip engaging position (FIG. 7C) and then move with rotation of the second crown 222 relative to the first crown 220 to fall back into the fully engaged position (FIG. 7A) with the first plurality of teeth 256.

The FIGURES provide a torque limiting system and a method of limiting torque applied to a threaded engagement between a knob and a first medical instrument. The system can include a knob configured to threadably engage the first medical instrument (e.g., the base, a robotic arm, another instrument, etc.) and couple with a second medical instrument (e.g., the rod, another instrument, etc.). The knob can include an outer housing including a portion configured as a handle, a first magnet positioned within the outer housing, and a second magnet positioned within the outer housing. The second magnet and the first magnet are configured to exert a repulsive force with respect to one another. The knob can include a first crown positioned within the outer housing and restrained from translation relative to the outer housing and a second crown coupled to the second magnet and positioned within the outer housing. The second crown can be rotatable with the outer housing and can be configured to selectively engage the first crown to apply a torque thereto. The knob can be configured to maintain a co-rotating engagement of the second crown with the first crown using the repulsive force between the first magnet and the second magnet until the torque reaches a predetermined torque between threads of the first crown and corresponding threads of the first medical instrument whereby the second crown overcomes the repulsive force to translate relative to the first crown and the torque applied to the first crown by the second crown substantially ceases.

Optionally, the second crown has a second plurality of teeth on a second side thereof that interface with and selectively engage a first plurality of teeth on a first side of the first crown. The knob can be configured to maintain a co-rotating engagement of the second plurality of teeth with the first plurality of teeth using the repulsive force between the first magnet and the second magnet until the predetermined torque is achieved. The second crown overcomes the repulsive force between the first magnet and the second magnet and translates relative to the outer housing and the first crown when the first crown becomes stationary by being fully threaded with the first medical instrument. When the first crown is threaded onto the first medical instrument to the predetermined torque, rotation of the first crown can cease and the second plurality of teeth slide along the first plurality of teeth. The second plurality of teeth of the second crown can slide along the first plurality of teeth of the first crown from a first fully engaged position to a tip engaging position and then can move with rotation of the second crown relative to the first crown to fall back into the fully engaged position with the first plurality of teeth. The second crown can include at least one lug configured to engage with the outer housing to prevent rotation of the second crown relative to the outer housing. The at least one lug can be received by a channel of the outer housing and the channel can allow for translation of the at least one lug therein. The knob can be configured to make an audible noise with the translation of the second crown relative to the first crown.

The method can optionally include providing a first crown of the knob including threads configured to engage with a mating threaded portion of the first medical instrument, providing a second crown of the knob adjacent the first crown, generating a repulsive force to maintain engagement between a second plurality of teeth of the second crown and a first plurality of teeth of the first crown, rotating the first crown to engage the threads of the first crown with the mating threaded portion of the first medical instrument, and upon the threads and the mating threaded portion engaging at a predetermined torque, disengaging torque applied to the first crown by overcoming the repulsive force and translating the second crown relative to the first crown.

The method can optionally include passing a rod of a second medical instrument through an aperture in the knob prior to the rotating the first crown to engage the threads of the first crown with the mating threaded portion of the first medical instrument. An outer housing of the knob can receive the first crown and the second crown and the outer housing transfers the torque of turning the knob to the first crown via the second crown. The method can optionally include limiting translation of the first crown relative to the outer housing and the second crown (e.g., via locking pin(s) and groove or another arrangement). The method can include the translating the second crown relative to the first crown produces an audible noise.

EXAMPLES

Example 1 is a knob for coupling a first medical instrument to a second medical instrument during an arthroplasty, the knob optionally comprising: an outer housing including a portion configured as a handle; a first magnet positioned within the outer housing; a second magnet positioned within the outer housing, wherein the second magnet and the first magnet are configured to exert a repulsive force with respect to one another; a first crown positioned within the outer housing and restrained from translation relative to the outer housing, wherein the first crown includes, a first plurality of teeth on a first side thereof and includes threads configured to engage with corresponding threads of the first medical instrument, and wherein the first crown is configured to couple with an end portion of the second medical instrument; and a second crown coupled to the second magnet and positioned within the outer housing, wherein the second crown is rotatable with the outer housing, wherein the second crown has a second plurality of teeth on a second side thereof that interface with and selectively engage the first plurality of teeth on the first side of the first crown; wherein the second crown overcomes the repulsive force between the first magnet and the second magnet and translates relative to the outer housing and the first crown when the first crown is threaded onto the first medical instrument to a predetermined torque.

In Example 2, the subject matter of Example 1 optionally includes, wherein the repulsive force between the first magnet and the second magnet maintains co-rotating engagement of the second plurality of teeth with the first plurality of teeth until the predetermined torque is applied between the threads of the first crown and the corresponding threads of the first medical instrument.

In Example 3, the subject matter of Example 2 optionally includes, wherein, when the first crown is threaded onto the first medical instrument to the predetermined torque, rotation of the first crown ceases and the second plurality of teeth slide along the first plurality of teeth.

In Example 4, the subject matter of Example 3 optionally includes, wherein the second plurality of teeth of the second crown slide along the first plurality of teeth of the first crown from a first fully engaged position to a tip engaging position and then move with rotation of the second crown relative to the first crown to fall back into the fully engaged position with the first plurality of teeth.

In Example 5, the subject matter of Examples 1-4 optionally includes, wherein the knob includes a passageway extending entirely therethrough, wherein a portion of the passageway receives a rod of the second medical instrument.

In Example 6, the subject matter of Example 5 optionally includes, wherein the first crown includes an aperture and a recess of the passageway, wherein the recess communicates with the aperture, and wherein the recess is configured to receive the end portion of the second medical instrument therein.

In Example 7, the subject matter of Example 6 optionally includes, wherein the end portion of the second medical instrument is captured by the first crown so as to be is substantially aligned with and positioned adjacent to the corresponding threads of the first medical instrument when the first crown is threaded onto the first medical instrument to the predetermined torque.

In Example 8, the subject matter of Examples 1-7 optionally includes, wherein the second crown includes at least one lug configured to engage with the outer housing to prevent rotation of the second crown relative to the outer housing, wherein the at least one lug is received by a channel of the outer housing, and wherein the channel allows for translation of the at least one lug therein.

In Example 9, the subject matter of Examples 1-8 optionally includes, two locking pins inserted in the outer housing and received by a groove along an outside of the first crown, wherein the two locking pins limit translation of the first crown relative to the outer housing.

Example 10 is a reference frame assembly for an arthroplasty, the reference frame assembly comprising: an optical tracker; a rod coupled to the optical tracker and extending therefrom; a base configured for coupling to an anatomy of a patient; and a knob for selectively coupling the rod with the base to mount the optical tracker in a desired position relative to the anatomy of the patient, the knob comprising: an outer housing including a portion configured as a handle; a first magnet positioned within the outer housing; a second magnet positioned within the outer housing, wherein the second magnet and the first magnet are configured to exert a repulsive force with respect to one another; a first crown positioned within the outer housing and restrained from translation relative to the outer housing, wherein the first crown includes, a first plurality of teeth on a first side thereof; and a second crown coupled to the second magnet and positioned within the outer housing, wherein the second crown is rotatable with the outer housing, wherein the second crown has a second plurality of teeth on a second side thereof that interface with and selectively engage the first plurality of teeth on the first side of the first crown; wherein the second crown overcomes the repulsive force between the first magnet and the second magnet and translates relative to the outer housing and the first crown when the first crown is threaded onto the base to a predetermined torque.

In Example 11, the subject matter of Example 10 optionally includes, wherein the first crown includes threads configured to engage with corresponding threads of the base, and wherein the first crown is configured to couple with an end portion of the rod.

In Example 12, the subject matter of Example 11 optionally includes, wherein the end portion of the rod is captured by the first crown so as to be is substantially aligned with and positioned adjacent to the corresponding threads of the base when the first crown is threaded onto the base to the predetermined torque.

In Example 13, the subject matter of Example 12 optionally includes, wherein the first crown includes an aperture and a recess therein, wherein the recess communicates with the aperture, and wherein the recess is configured to receive the end portion of the rod and the aperture captures a shaft of the rod therein.

In Example 14, the subject matter of Examples 10-13 optionally includes, wherein the repulsive force between the first magnet and the second magnet maintains co-rotating engagement of the second plurality of teeth with the first plurality of teeth until the predetermined torque is reached.

In Example 15, the subject matter of Example 14 optionally includes, wherein, when the first crown is threaded onto the base to the predetermined torque, rotation of the first crown ceases and the second plurality of teeth slide along the first plurality of teeth.

In Example 16, the subject matter of Example 15 optionally includes, wherein the second plurality of teeth of the second crown slide along the first plurality of teeth of the first crown from a first fully engaged position to a tip engaging position and then move with rotation of the second crown relative to the first crown to fall back into the fully engaged position with the first plurality of teeth.

In Example 17, the subject matter of Examples 10-16 optionally includes, wherein the knob includes a passageway extending entirely therethrough, wherein a portion of the passageway receives part of the rod and another portion of the passageway receives part of the base.

Example 18 is a torque limiting system, optionally comprising: a knob configured to threadably engage a first medical instrument and couple with a second medical instrument, the knob comprising: an outer housing including a portion configured as a handle; a first magnet positioned within the outer housing; a second magnet positioned within the outer housing, wherein the second magnet and the first magnet are configured to exert a repulsive force with respect to one another; a first crown positioned within the outer housing and restrained from translation relative to the outer housing; and a second crown coupled to the second magnet and positioned within the outer housing, wherein the second crown is rotatable with the outer housing and is configured to selectively engage the first crown to apply a torque thereto; wherein the knob is configured to maintain a co-rotating engagement of the second crown with the first crown using the repulsive force between the first magnet and the second magnet until the torque reaches a predetermined torque between threads of the first crown and corresponding threads of first medical instrument whereby the second crown overcomes the repulsive force to translate relative to the first crown and the torque applied to the first crown by the second crown substantially ceases.

In Example 19, the subject matter of Example 18 optionally includes, wherein the second crown has a second plurality of teeth on a second side thereof that interface with and selectively engage a first plurality of teeth on a first side of the first crown, wherein the knob is configured to maintain a co-rotating engagement of the second plurality of teeth with the first plurality of teeth using the repulsive force between the first magnet and the second magnet until the predetermined torque is achieved.

In Example 20, the subject matter of Example 19 optionally includes, wherein the second crown overcomes the repulsive force between the first magnet and the second magnet and translates relative to the outer housing and the first crown when the first crown becomes stationary by being fully threaded with the first medical instrument.

In Example 21, the subject matter of Example 20 optionally includes, wherein, when the first crown is threaded onto the first medical instrument to the predetermined torque, rotation of the first crown ceases and the second plurality of teeth slide along the first plurality of teeth.

In Example 22, the subject matter of Example 21 optionally includes, wherein the second plurality of teeth of the second crown slide along the first plurality of teeth of the first crown from a first fully engaged position to a tip engaging position and then move with rotation of the second crown relative to the first crown to fall back into the fully engaged position with the first plurality of teeth.

In Example 23, the subject matter of Examples 18-22 optionally includes, wherein the knob includes a passageway extending entirely therethrough, wherein a portion of the passageway receives a rod of the second medical instrument.

In Example 24, the subject matter of Example 23 optionally includes, wherein the first crown includes an aperture and a recess of the passageway, wherein the recess communicates with the aperture, and wherein the recess is configured to receive an end portion of the rod therein.

In Example 25, the subject matter of Example 24 optionally includes, wherein the end portion of the second medical instrument is captured by the first crown so as to be is substantially aligned with and positioned adjacent to the corresponding threads of the first medical instrument when the first crown is threaded onto the first medical instrument to the predetermined torque.

In Example 26, the subject matter of Examples 18-25 optionally includes, wherein the second crown includes at least one lug configured to engage with the outer housing to prevent rotation of the second crown relative to the outer housing, wherein the at least one lug is received by a channel of the outer housing, and wherein the channel allows for translation of the at least one lug therein.

In Example 27, the subject matter of Examples 18-26 optionally includes, two locking pins inserted in the outer housing and received by a groove along an outside of the first crown, wherein the two locking pins limit translation of the first crown relative to the outer housing.

In Example 28, the subject matter of Examples 18-27 optionally includes, wherein the knob is configured to make an audible noise with the translation of the second crown relative to the first crown.

Example 29 is a method of limiting torque applied to a threaded engagement between a knob and a first medical instrument, optionally comprising: providing a first crown of the knob including threads configured to engage with a mating threaded portion of the first medical instrument; providing a second crown of the knob adjacent the first crown; generating a repulsive force to maintain engagement between a second plurality of teeth of the second crown and a first plurality of teeth of the first crown; rotating the first crown to engage the threads of the first crown with the mating threaded portion of the first medical instrument; and upon the threads and the mating threaded portion engaging at a predetermined torque, disengaging torque applied to the first crown by overcoming the repulsive force and translating the second crown relative to the first crown.

In Example 30, the subject matter of Example 29 optionally includes, passing a rod of a second medical instrument through an aperture in the knob prior to the rotating the first crown to engage the threads of the first crown with the mating threaded portion of the first medical instrument.

In Example 31, the subject matter of Examples 29-30 optionally includes, wherein an outer housing of the knob receives the first crown and the second crown and transfers the torque of turning the knob to the first crown via the second crown.

In Example 32, the subject matter of Example 31 optionally includes, limiting translation of the first crown relative to the outer housing and the second crown.

In Example 33, the subject matter of Examples 29-32 optionally includes, wherein the translating the second crown relative to the first crown produces an audible noise.

Example 34 is at least one machine-readable medium including instructions that, when executed by processing circuitry, cause the processing circuitry to perform operations to implement of any of Examples 1-33.

Example 35 is an apparatus comprising means to implement of any of Examples 1-33.

Example 36 is a system to implement of any of Examples 1-33.

Example 37 is a method to implement of any of Examples 1-33.

Each of these non-limiting examples can stand on its own, or can be combined in various permutations or combinations with one or more of the other examples.

Various Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A knob for coupling a first medical instrument to a second medical instrument during an arthroplasty, the knob comprising:
   an outer housing including a portion configured as a handle;
   a first magnet positioned within the outer housing;
   a second magnet positioned within the outer housing, wherein the second magnet and the first magnet are configured to exert a repulsive force with respect to one another;
   a first crown positioned within the outer housing and restrained from translation relative to the outer housing, wherein the first crown includes a first plurality of teeth on a first side thereof and includes threads configured to engage with corresponding threads of the first medical instrument, and wherein the first crown is configured to couple with an end portion of the second medical instrument; and
   a second crown coupled to the second magnet and positioned within the outer housing, wherein the second crown is rotatable with the outer housing, wherein the second crown has a second plurality of teeth on a second side thereof that interface with and selectively engage the first plurality of teeth on the first side of the first crown;
   wherein the second crown overcomes the repulsive force between the first magnet and the second magnet and translates relative to the outer housing and the first crown when the first crown is threaded onto the first medical instrument to a predetermined torque.

2. The knob of claim 1, wherein the repulsive force between the first magnet and the second magnet maintains co-rotating engagement of the second plurality of teeth with the first plurality of teeth until the predetermined torque is applied between the threads of the first crown and the corresponding threads of the first medical instrument.

3. The knob of claim 2, wherein, when the first crown is threaded onto the first medical instrument to the predetermined torque, rotation of the first crown ceases and the second plurality of teeth slide along the first plurality of teeth.

4. The knob of claim 3, wherein the second plurality of teeth of the second crown slide along the first plurality of teeth of the first crown from a first fully engaged position to a tip engaging position and then move with rotation of the second crown relative to the first crown to fall back into the first fully engaged position with the first plurality of teeth.

5. The knob of claim 1, wherein the knob includes a passageway extending entirely therethrough, wherein a portion of the passageway receives a rod of the second medical instrument.

6. The knob of claim 5, wherein the first crown includes an aperture and a recess of the passageway, wherein the recess communicates with the aperture, and wherein the recess is configured to receive the end portion of the second medical instrument therein.

7. The knob of claim 6, wherein the end portion of the second medical instrument is captured by the first crown so as to be is substantially aligned with and positioned adjacent to the corresponding threads of the first medical instrument when the first crown is threaded onto the first medical instrument to the predetermined torque.

8. The knob of claim 1, wherein the second crown includes at least one lug configured to engage with the outer housing to prevent rotation of the second crown relative to the outer housing, wherein the at least one lug is received by a channel of the outer housing, and wherein the channel allows for translation of the at least one lug therein.

9. The knob of claim 1, further comprising two locking pins inserted in the outer housing and received by a groove along an outside of the first crown, wherein the two locking pins limit translation of the first crown relative to the outer housing.

10. A reference frame assembly for an arthroplasty, the reference frame assembly comprising:
    an optical tracker;
    a rod coupled to the optical tracker and extending therefrom;
    a base configured for coupling to an anatomy of a patient; and
    a knob for selectively coupling the rod with the base to mount the optical tracker in a desired position relative to the anatomy of the patient, the knob comprising:
        an outer housing including a portion configured as a handle;
        a first magnet positioned within the outer housing;
        a second magnet positioned within the outer housing, wherein the second magnet and the first magnet are configured to exert a repulsive force with respect to one another;
        a first crown positioned within the outer housing and restrained from translation relative to the outer housing, wherein the first crown includes a first plurality of teeth on a first side thereof; and
        a second crown coupled to the second magnet and positioned within the outer housing, wherein the second crown is rotatable with the outer housing, wherein the second crown has a second plurality of teeth on a second side thereof that interface with and selectively engage the first plurality of teeth on the first side of the first crown;
        wherein the second crown overcomes the repulsive force between the first magnet and the second magnet and translates relative to the outer housing and the first crown when the first crown is threaded onto the base to a predetermined torque.

11. The reference frame assembly of claim 10, wherein the first crown includes threads configured to engage with corresponding threads of the base, and wherein the first crown is configured to couple with an end portion of the rod.

12. The reference frame assembly of claim 11, wherein the end portion of the rod is captured by the first crown so as to be is substantially aligned with and positioned adjacent to the corresponding threads of the base when the first crown is threaded onto the base to the predetermined torque.

13. The reference frame assembly of claim 12, wherein the first crown includes an aperture and a recess therein, wherein the recess communicates with the aperture, and wherein the recess is configured to receive the end portion of the rod and the aperture captures a shaft of the rod therein.

14. The reference frame assembly of claim 10, wherein the repulsive force between the first magnet and the second magnet maintains co-rotating engagement of the second plurality of teeth with the first plurality of teeth until the predetermined torque is reached.

15. The reference frame assembly of claim 14, wherein, when the first crown is threaded onto the base to the predetermined torque, rotation of the first crown ceases and the second plurality of teeth slide along the first plurality of teeth.

16. The reference frame assembly of claim 15, wherein the second plurality of teeth of the second crown slide along the first plurality of teeth of the first crown from a first fully engaged position to a tip engaging position and then move with rotation of the second crown relative to the first crown to fall back into the first fully engaged position with the first plurality of teeth.

17. The reference frame assembly of claim 10, wherein the knob includes a passageway extending entirely therethrough, wherein a portion of the passageway receives part of the rod and another portion of the passageway receives part of the base.

18. A torque limiting system, comprising:
    a knob configured to threadably engage a first medical instrument and couple with a second medical instrument, the knob comprising:
        an outer housing including a portion configured as a handle;
        a first magnet positioned within the outer housing;
        a second magnet positioned within the outer housing, wherein the second magnet and the first magnet are configured to exert a repulsive force with respect to one another;
        a first crown positioned within the outer housing and restrained from translation relative to the outer housing; and
        a second crown coupled to the second magnet and positioned within the outer housing, wherein the second crown is rotatable with the outer housing and is configured to selectively engage the first crown to apply a torque thereto;
        wherein the knob is configured to maintain a co-rotating engagement of the second crown with the first crown using the repulsive force between the first magnet and the second magnet until the torque reaches a predetermined torque between threads of the first crown and corresponding threads of first medical instrument whereby the second crown overcomes the repulsive force to translate relative to the first crown and the torque applied to the first crown by the second crown substantially ceases.

19. The torque limiting system of claim 18, wherein the second crown has a second plurality of teeth on a second side thereof that interface with and selectively engage a first plurality of teeth on a first side of the first crown, wherein the knob is configured to maintain a co-rotating engagement of the second plurality of teeth with the first plurality of teeth using the repulsive force between the first magnet and the second magnet until the predetermined torque is achieved.

20. The torque limiting system of claim 19, wherein the second crown overcomes the repulsive force between the first magnet and the second magnet and translates relative to the outer housing and the first crown when the first crown becomes stationary by being fully threaded with the first medical instrument, wherein, when the first crown is threaded onto the first medical instrument to the predetermined torque, rotation of the first crown ceases and the second plurality of teeth slide along the first plurality of teeth, and wherein the second plurality of teeth of the second crown slide along the first plurality of teeth of the first crown from a first fully engaged position to a tip engaging position and then move with rotation of the second crown relative to the first crown to fall back into the first fully engaged position with the first plurality of teeth.

* * * * *